FIG. 1

BAGASSE AND OTHER FIBROUS,
NON-WOODY, LIGNOCELLULOSIC
PLANT MATERIALS

MIX WITH SUFFICIENT WATER, NaOH AND, OPTIONALLY, S, $Na_2S$, OR $Na_2S_x$, TO FORM A MIXTURE CHARACTERIZED BY A LIQUOR TO DRY PLANT MATERIAL RATIO OF 2-15:1, A SULFIDITY OF LESS THAN 15% AND A CHEMICAL USE OF 6-20%; DRY PLANT MATERIAL BASIS

HEAT MIXTURE UNDER PRESSURE TO 130-210° C.

OVER A TIME PERIOD OF

UP TO 45 MINUTES.

MAINTAIN MIXTURE AT 130-210° C. FOR FROM 1-25 MINUTES

PULP PRODUCT

SAMUEL B. KNAPP
JAMES D. WETHERN

*INVENTORS*

BY *Eugene D. Farley*

ATTY.

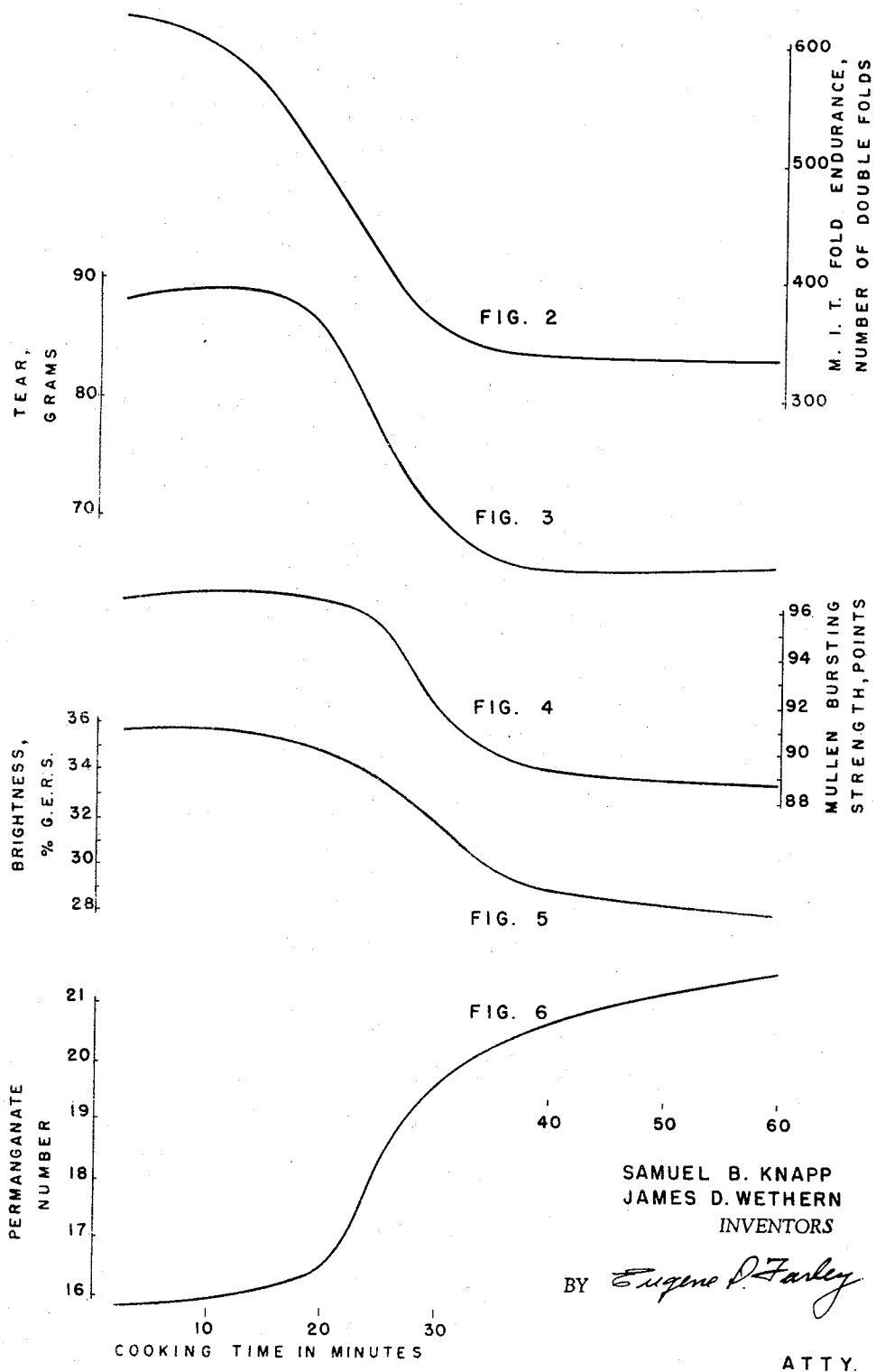

2,944,929
RAPID SODA PROCESS FOR PULPING BAGASSE AND OTHER NON-WOODY PLANT LIGNOCELLULOSE

Samuel B. Knapp, Honolulu, Hawaii, and James D. Wethern, Camas, Wash., assignors to Hawaiian Development Company, Ltd., Honolulu, Hawaii, a corporation of Hawaii Filed Jan. 5, 1959, Ser. No. 784,908

14 Claims. (Cl. 162—90)

This invention relates to a rapid process for the pulping by a modified soda process of bagasse and other fibrous, non-woody, lignocellulose-containing plant materials.

This application is a continuation-in-part of the application of Samuel B. Knapp et al., Serial No. 467,362, filed November 8, 1954, now abandoned, for Rapid Soda Process for Pulping Bagasse and Other Non-Woody Plant Lignocellulose.

When pulping bagasse by conventional commercial soda procedures it has been the practice first to comminute the bagasse if necessary and then to mix it with water and the pulping chemicals to form a mixture wherein the liquor to oven dry bagasse ratio is at least 6:1, and usually is about 8:1. This liquor contains from 20 to 30% by weight of chemicals calculated as sodium hydroxide, based on the weight of the oven dry bagasse. In certain cases, small amounts of elemental sulfur, of sodium sulfide, or sodium polysulfides are added to the mixture to improve the bleachability, strength and yield of pulp. The amount of sulfur-bearing material thus added is such that the sulfidity of the mixture does not exceed about 15%.

The pulping mixture is introduced into a pressure vessel and the temperature and pressure gradually increased to the selected level over a period of from 1 to 4 hours. It is maintained at the chosen temperature and pressure for a cooking period of between 2 and 20 hours. It then may be discharged from the pressure vessel at the cooking pressure. In the alternative, the pressure first may be released gradually over a gassing-off period of up to 2 hours, the temperature of the mixture during this period corresponding to the pressure in the pressure vessel, after which the mixture is discharged. Accordingly it will be apparent that since the conventional soda process requires a very long cooking period under severe cooking conditions, using a high concentration of pulping chemicals, there is obtained a correspondingly low yield of a low strength pulp which cannot be bleached by the usual procedures to a brightness level of more than about 75% G.E.R.S.

We now have discovered that by carefully controlling the reaction conditions within stipulated limits the digestion period required for the soda pulping of bigasse and like materials may be reduced from a time of from 2 to 20 hours to a time of but a few minutes. As a result, degradation of the cellulose, hemicelluloses or pentosans is avoided and a pulp is produced which is exceptionally strong and readily bleachable. Also, a very high production rate is obtained because of the short cooking time required.

It is a particular feature of the process of this invention that it leads to the production of a papermaking pulp which is of a high degree of brightness and which may be bleached to an even higher brightness level not only without loss of pulp strength but even, in some cases, with augmentation of the same, using a relatively small amount of bleaching agent. Thus, as will be demonstrated further in the examples given hereinbelow, a soda bagasse pulp prepared by the presently described process has a brightness of 37.4% G.E.R.S. and an M.I.T. fold endurance of 520 double folds. However, a bagasse soda pulp prepared by the conventional procedure has a brightness of but 29.8% and a fold endurance of but 201 double folds, Furthermore, when the presently described pulp is bleached by the conventional chlorine bleaching methods its brightness may readily be increased to a value of 85.2% while actually increasing the fold endurance from 520 to 730 double folds, whereas the bagasse soda pulps prepared by the conventional procedures cannot normally be bleached above about 75% brightness by the same bleaching methods.

It is believed that this remarkable result may be attributable to the fact that in the conventional soda pulping procedure the separated lignin or its reaction products, may be redeposited on the cellulose during the protracted cooking period. This ligneous deposit then caused the production of a pulp of a lower degree of brightness which resists the action of bleaching agents subsequently employed. However, in the instant procedure, the separated lignin or lignin derivatives are not redeposited on the cellulose during the very short cooking interval. Accordingly, a cooked pulp of a higher brightness level is obtained and this may be bleached readily to a still higher value.

In addition, the presently described process leads to the production of a high yield of papermaking pulp which is relatively very strong compared with bagasse pulps prepared by conventional methods. This desirable result is believed attributable to the fact that the short digestion period using low concentrations of cooking agents leads to the formation of a product having a high content of pentosans. Thus, whereas a bagasse pulp produced by the conventional procedure using a high concentration of cooking agents leads to the production of a pulp having a pentosan content of about 10% by weight, often only 5% or less by weight, the preesnt procedure leads to the production of a pulp having a pentosan content of at least 10%, preferably of the order of 20-30%, by weight. This obviously increases the pulp yield substantially and at the same time makes the pulp stronger since the pentosans exert a beneficial influence on pulp strength during subsequent papermaking procedures. It also clearly distinguishes the presently described papermaking pulp from the pulps of processes such as that of Gans French 943,617 (10/11/48), which yields a dissolving pulp high in alpha cellulose and very low in pentosans (less than 5%).

It therefore is the general object of this invention to provide a rapid soda process for pulping sugar cane bagasse and like fibrous, non-woody, lignocellulosic plant materials, using a relatively small amount of pulping agents.

It is another object of this invention to provide a simple process for the soda pulping of sugar cane bagasse and the like by subjecting it to the action of the pulping chemicals for an extremely short period of time to produce a pulp of commercial quality which does not require subsequent mechanical defibering.

It is still another object of this invention to provide a soda process of cooking bagasse rapidly and economically to produce pulps of widely varying characteristics which are suitable for conversion to boards, coarse wrapping papers, or fine quality unbleached or bleached papers.

It is yet another object of this invention to provide a rapid soda process of preparing pulp from bagasse and like plant material which pulp may be bleached to an unusually high degree of brightness without loss of strength, using a relatively small proportion of bleaching agent.

It is a further object of this invention to provide a soda process of cooking lignocellulosic plant materials which may be applied to such materials as straw to produce a pulp suitable for the manufacture of fine quality papers substantially free of specks derived from the nodes of the straw.

Considering the foregoing in greater detail and with particular reference to the drawings wherein Fig. 1 is a flow plan of the procedure of this invention and Figs. 2–6 are graphs setting forth the properties of pulps produced by such procedure:

The presently described process may be applied to lignocellulosic plant materials derived from a variety of sources. Thus, although it is described herein with particular reference to sugar cane bagasse, it also is applicable to cereal straws, cornstalks, grasses and other agricultural residues derived from the processing of fibrous, non-woody lignocellulosic plants. Where bagasse is the starting material, it may comprise either the whole or depithed product.

The plant material, whatever its source, may be reduced to the form of small pieces or shreds. Such a size reduction may occur during prior processing steps when the plant material is a residue from commercial operations. In other cases, however, it may be reduced in size if necessary by cutting or milling it in a separate operation in apparatus of suitable construction and design.

The comminuted plant material next may be mixed with water and the pulping chemicals in a suitable mixing vessel at atmospheric or superatmospheric pressures, as desired, after which the resulting mixture may be transferred to the digester. Preferably, however, the plant material is placed in a closed type digester or any other suitable pressure vessel and mixed with the aqueous digesting liquor containing the active soda pulping agent, i.e., sodium hydroxide and, optionally, sodium carbonate, sulfur, sodium sulfide, or sodium polysulfide. If the latter chemicals are employed, they are used in proportions such as would give a sulfidity $$\frac{Na_2S}{Na_2S + NaOH} \times 100$$

of less than 15%.

Sufficient water is employed in the pulping mixture to produce a liquor to oven dry plant material ratio of 2–15:1, i.e. of from 2:1 to 15:1. However, when whole bagasse is employed as the starting material, a liquor to dry bagasse ratio of from 4–10:1 is preferred; when depithed bagasse is employed, a liquor to dry bagasse ratio of 2–6:1 is preferred.

Sufficient chemicals are employed in the cooking operation to give a chemical use of from 6 to 20% by weight, preferably from 9 to 16% by weight, expressed as NaOH. By chemical use is meant the total amount of active chemicals (NaOH and S, $Na_2S$, or $Na_2S_x$, if employed) expressed as NaOH and based on the weight of oven dry plant material.

The pulping mixture in the digester is heated over a rise time of up to 45 minutes, preferably from 1 second to 15 minutes. At the end of this time a cooking temperature of from 130–210° C., preferably from 150–190° C. is reached. Also, the pressure developed rises to a broad value of from 14–240 p.s.i.g. as determined by such factors as the temperature, the hydraulic pressure present in the digester, etc.

The charge is maintained under pressure at this cooking temperature for a digestion period of broadly from 1–25 minutes, preferably from 2–15 minutes, the shorter digestion periods applying to the higher temperature values, and vice versa. During this period the major proportion of the lignin is separated from the carbohydrate fraction of the lignocellulose to form a cellulose pulp.

After the digestion period has been completed, the charge may be blown at the cooking pressure or, optionally, the pressure may be reduced to any desired blowing pressure and the contents of the digester blown or dumped into the receiving vessel. In any event, the gas-off or pressure reduction time is optional and is kept at a minimum. If desired it may be substantially instantaneous. Thus, it may comprise a time period of broadly, up to 15 minutes, preferably from 1 second to 5 minutes. During this time the temperature of the charge decreases to the level which substantially corresponds to the blowing pressure employed.

The pulp product discharged into the receiving vessel is a fully cooked chemical pulp and is ready for further processing by conventional post-pulping procedures. Thus it may be separated from the cooking liquor, washed, screened and bleached in the usual manner and then used in the manufacture of boards and papers without any defibering treatment such as is required in the manufacture of semichemical pulps.

The presently described soda process for the rapid pulping of bagasse and like lignocellulosic plant materials is further illustrated in the following examples.

EXAMPLE I

Six kilograms of depithed bagasse (oven dry basis) was charged into a 2.5 cubic foot stainless steel digester. The digester was steam-jacketed and had one hollow trunnion fitted so that steam or cooking liquor could be admitted directly to the charge during the cook if desired. The digester was motor driven through a gear and chain train and could be tumbled at the rate of one revolution every three minutes.

The soda cooking liquor containing sodium hydroxide as the sole active pulping agent was introduced into the digester in such a manner as to wilt the bagasse during the charging period. Sufficient liquor was employed to give a chemical use of 15.5% (expressed as NaOH), based on the oven-dry bagasse. The liquor to oven-dry bagasse ratio was 4:1.

The digester was capped and its rotation initiated for agitation of the contents. The shell steam and direct steam both were turned on full. At the end of 3 minutes the digester was gassed-off briefly. After six minutes a temperature of 175° C. and a pressure of 115 p.s.i.g. had been reached.

The contents of the digester were maintained at 175° C. and 115 p.s.i.g. for a cooking time of 8 minutes, after which the rotation of the digester was stopped and it was connected to the blow line. The blow valve was opened immediately and the cook blown instantaneously to the blow tank. The total elapsed time was 14 minutes of which 8 minutes were at the maximum cooking temperature of 175° C.

The resulting product was a fully cooked chemical pulp. After separation from the liquor, washing and screening, it was suitable for use in making paper or board by conventional papermaking procedures. The total pulp yield was 59.9% by weight of the original oven dry weight of the bagasse. It contained 28.6% by weight of pentosans.

The pulp derived from the presently described procedure was easily bleached, requiring a relatively small proportion of bleaching chemical for a high degree of brightness. It was bleached by the conventional three-stage chlorine-caustic-hypochlorite bleaching process using a total chlorine application of 4.8%, based on the weight of the oven-dry pulp.

In the first bleaching stage the pulp at a consistency of 2.0% was treated with 3.4% chlorine at room temperature over a time period of 60 minutes. In the second bleaching stage the partially bleached pulp at a consistency of 12% was extracted with caustic soda using 1.5% by weight NaOH at 60° C. over a time period of 60 minutes. In the third bleaching stage the partially bleached and caustic extracted pulp at a consistency of 12% was treated with a solution of calcium hypochlorite containing sufficient sodium hydroxide buffer to maintain the pH at above 8.3 throughout the entire stage. This stage was continued using 1.4% by weight chlorine at a temperature of 34° C. over a time period of 3 hours and 45 minutes. The pulp was washed with fresh water after each stage of the bleaching treatment.

Bleached and unbleached samples of the pulp then were tested by standard test procedures for brightness, Mullen bursting strength, tensile strength (breaking length), M.I.T. fold endurance, and tear strength, the results being compared with the values obtained in the case of a control sample of conventional unbleached soda bagasse pulp which had been digested under the same conditions as above except that a rise time of 60 minutes and a time at temperature of 5 hours were employed, i.e., a total cooking period of 6 hours versus one of 14 minutes. The results are given in Table I:

*Table I*

|  | Unbleached Control Pulp | Pulp of Present Process | |
|---|---|---|---|
|  |  | Unbleached | Bleached |
| Total yield, percent | 56.6 | 59.9 |  |
| Brightness, percent (G.E.R.S. at 460 millimicrons) | 29.8 | 37.4 | 85.2 |
| Mullen bursting strength points [1,2] | 82 | 105 | 108 |
| Breaking length, meters [2] | 7,900 | 8,900 | 8,800 |
| M.I.T. fold endurance, number of double folds [2] | 201 | 520 | 730 |
| Tear, grams [1,2] | 75 | 90 | 90 |

[1] Corrected to 100 pounds per ream basis weight (25 x 40 x 500).
[2] At 200 cc., Canadian Standard Freeness.

EXAMPLE II

The procedure of Example I was repeated, using whole bagasse rather than the depithed product. Sodium hydroxide was used as the sole pulping chemical, its use being 10%. The liquor to oven dry bagasse ratio was 6:1. The time to temperature was 15 minutes and the time at temperature 5 minutes, followed by an instantaneous blow.

In this case the total yield of pulp was 67.2% by weight based on the weight of the original oven dry bagasse. The pulp was a full chemical pulp, suitable for the manufacture of paper or board by conventional papermaking procedures.

EXAMPLE III

The procedure of Example I again was followed using depithed bagasse and, as pulping chemicals, a combination of sodium hydroxide and sodium sulfide. The total pulping chemical used (NaOH+Na$_2$S) was 15.5% (expressed as NaOH) and sufficient Na$_2$S was employed to produce a cooking liquor having an 8% sulfidity. The liquor to oven-dry bagasse ratio was 4:1.

Again a cooking temperature of 170° C. and a cooking pressure of 100 p.s.i.g. were employed. The time to temperature was 6 minutes and the time at temperature 7 minutes, the blow again being substantially instantaneous.

The pulp product was obtained in a yield of 60.8% based on the weight of the original oven-dry bagasse. It was a fully pulped product similar in properties to that produced and described in Example I.

EXAMPLE IV

The general procedure of Example I again was followed, using 4.5 kilograms of wheat straw as the starting material. The sole pulping chemical was sodium hydroxide used in the amount of 15.5% by weight, expressed as NaOH, based on the oven-dry weight of the straw. The liquor to oven-dry straw ratio was 6:1.

The cooking temperature and pressure were 170° C. and 100 p.s.i.g. respectively. The time to temperature was 5 minutes and the time at temperature 2 minutes, followed by a substantially instantaneous blow.

The yield of pulp product was 49.1% by weight based on the weight of the original oven-dry straw. It had a permanganate number of 13.1 and could be bleached very easily to a high degree of brightness. Furthermore, the nodes of the straw stems were not completely cooked during this short cooking time. As a result they could be removed easily from the pulp by a conventional screening operation.

The pulp product obtained thus was well suited for the manufacture of fine quality papers, the papers being substantially free of specks derived from the nodes of the straw. This is in sharp contrast to the results obtained when making paper from pulp prepared by cooking straw using the conventional soda pulping procedures where, because of the long cooking time, the straw nodes are digested sufficiently so that they pass through fine screens and are visible in the form of shiny specks in the final sheet of paper.

EXAMPLE V

To test the effect of varying the cooking time (time at temperature) on the pulp properties, a series of tests was run employing cooking periods of 2, 10, 20, 30 and 60 minutes respectively. Each test was carried out on a quantity of 5.0 kilograms of depithed bagasse, oven-dry basis, using sodium hydroxide as the sole pulping agent in an amount of 10% (expressed as NaOH) based on the oven dry bagasse. In general, the procedure described in the preceding examples was followed. The liquor to oven-dry bagasse ratio was 4:1, the temperature rise time 10 minutes, and the maximum cooking temperature was 170° C. The results are set forth in Table II and in Figs. 2-6 inclusive, based thereon.

*Table II*

| Time at Temperature (Minutes) | 2 | 10 | 20 | 30 | 60 |
|---|---|---|---|---|---|
| Pentosan content, percent | 25.8 | 26.7 | 26.8 | 27.1 | 27.4 |
| Permanganate No. | 15.6 | 16.5 | 16.5 | 19.6 | 21.7 |
| Brightness, percent GERS | 37.3 | 33.8 | 35.3 | 31.4 | 28.0 |
| Mullen Bursting Strength points [1,2] | 97 | 97 | 97 | 92 | 89 |
| Tear, grams [1,2] | 79 | 81 | 79 | 70 | 67 |
| M.I.T. Fold Endurance, No. of Double Folds [2] | 628 | 610 | 499 | 340 | 360 |

[1] Corrected to 100 pounds per ream basis weight (25 x 40 x 500).
[2] At 200 cc., Canadian Standard Freeness.

It will be apparent from a review of the data of Tables I and II and of Figs. 2-6 that the pulp prepared by the presently described procedure employing a critical digestion time of from 1-25 minutes is of a relatively high degree of brightness as compared with that prepared by the conventional procedures employing longer digestion periods. Also, it may readily be bleached to an even higher degree of brightness, using a relatively small amount of bleaching chemicals.

Furthermore, the strength qualities of the presently described pulp are substantially higher than are those of conventional pulp and are actually improved by the bleaching operation. This is evident from the comparative values given in Table I for the Mullen, breaking length, M.I.T. fold, and tearing strength. Thus, whereas the unbleached control pulp had a fold endurance of but 201 double folds, the unbleached pulp of the present process had a fold endurance of 520 double folds and the bleached pulp a fold endurance of 730 double folds. Similarly the Mullen values demonstrate the superiority of the presently described pulp over the control, as well as the fact that the strength actually is improved by bleaching.

Still further, these desirable results are obtained by a rapid pulping procedure requiring but a few minutes total elapsed time, as compared with a time of several hours required by the conventional procedure. This results, of course, in a very substantially increased production of pulp using equipment of given capacity. Also, the chemical use is so very low as to effect substantial additional economies.

Having thus described our invention in preferred embodiments we claim:

1. In the soda process for pulping fibrous, nonwoody lignocellulosic plant materials with an aqueous digesting liquor containing an active soda pulping agent comprising predominantly sodium hydroxide: the improvement which comprises producing a strong, easily bleachable, papermaking pulp having a pentosan content of the order of 20–30% by weight, by the combination of process steps comprising forming a mixture comprising the plant material and the aqueous digesting liquor, the ratio of liquor to oven-dry plant material being from 2:1 to 15:1 and the pulping agent use being from 6–20% by weight based on the weight of the oven-dry plant material; heating the mixture under pressure to a temperature of from 130°–210° C. over a rise time period of up to 45 minutes, and maintaining the mixture under pressure at 130°–210° C. for a digestion time period of from 1–25 minutes, the shorter digestion periods applying to the higher digestion temperatures and vice versa.

2. The process of claim 1 wherein the lignocellulosic plant material comprises sugar cane bagasse.

3. The process of claim 1 wherein the lignocellulosic plant material comprises whole sugar cane bagasse and the ratio of liquor to oven dry plant material is from 4:1 to 10:1.

4. The process of claim 1 wherein the lignocellulosic plant material comprises depithed sugar cane bagasse and the ratio of liquor to oven dry plant material is from 2:1 to 6:1.

5. The process of claim 1 wherein the lignocellulosic plant material comprises cereal straw.

6. The process of claim 1 wherein the use of pulping agent is from 9–16% by weight.

7. The process of claim 1 wherein the mixture is heated to and maintained at a temperature of 150–190° C.

8. The process of claim 1 wherein the mixture is heated under pressure to a temperature of from 130–210° C. over a time period of from 1 second to 15 minutes.

9. The process of claim 1 wherein the mixture is maintained under pressure at a temperature of 130–210° C. over a time period of 2–15 minutes.

10. The process of claim 1 wherein the mixture is heated under pressure to a temperature of 130–210° C. over a time period of 1 second to 15 minutes and maintained under pressure at said temperature for a time period of 2–15 minutes.

11. The process of claim 1 wherein after maintaining the mixture under pressure at 130–210° C. for from 1–25 minutes, the pressure is reduced to blowing pressure over a time period of up to 15 minutes.

12. In the soda process for pulping fibrous, nonwoody lignocellulosic plant materials with an aqueous digesting liquor containing an active soda pulping agent comprising predominantly sodium hydroxide: the improvement which comprises producing a strong, easily bleachable, papermaking pulp having a pentosan content of the order of 20–30% by weight, by the combination of process steps comprising forming a mixture comprising the plant material and the aqueous digesting liquor, the ratio of liquor to oven-dry plant material being from 2:1 to 15:1 and the pulping agent use being from 9–16% by weight based on the weight of the oven-dry plant material; heating the mixture under pressure to a temperature of from 150°–190° C. over a rise time period of from 1 second to 15 minutes, and maintaining the mixture under pressure at 150°–190° C. for a digestion time period of from 2–15 minutes, the shorter digestion time periods applying to the higher digestion temperatures and vice versa.

13. The process of claim 12 wherein the lignocellulosic plant material comprises sugar cane bagasse.

14. The process of claim 12 wherein after maintaining the mixture under pressure at a temperature of 150–190° C. over a time period of 2–15 minutes the pressure is reduced to blowing pressure over a time period of up to 15 minutes.

References Cited in the file of this patent

UNITED STATES PATENTS

| | | |
|---|---|---|
| 116,933 | Cresson | July 11, 1871 |
| 296,935 | Dahl | Apr. 15, 1884 |
| 680,079 | Sherwood | Aug. 6, 1901 |
| 1,679,441 | Nanji | Aug. 7, 1928 |
| 1,782,755 | Williams | Nov. 25, 1930 |
| 1,813,184 | McQuiston | July 7, 1931 |
| 1,845,488 | Darling | Feb. 16, 1932 |
| 2,101,253 | Gunther et al. | Dec. 7, 1937 |
| 2,854,334 | Knapp et al. | Sept. 30, 1958 |

FOREIGN PATENTS

| | | |
|---|---|---|
| 943,617 | France | Oct. 11, 1948 |

OTHER REFERENCES

Casey: Pulp and Paper, vol. I, published by Interscience Publishers, N.Y., 1952 (pages 236 and 238 relied upon.)